Patented Jan. 26, 1943

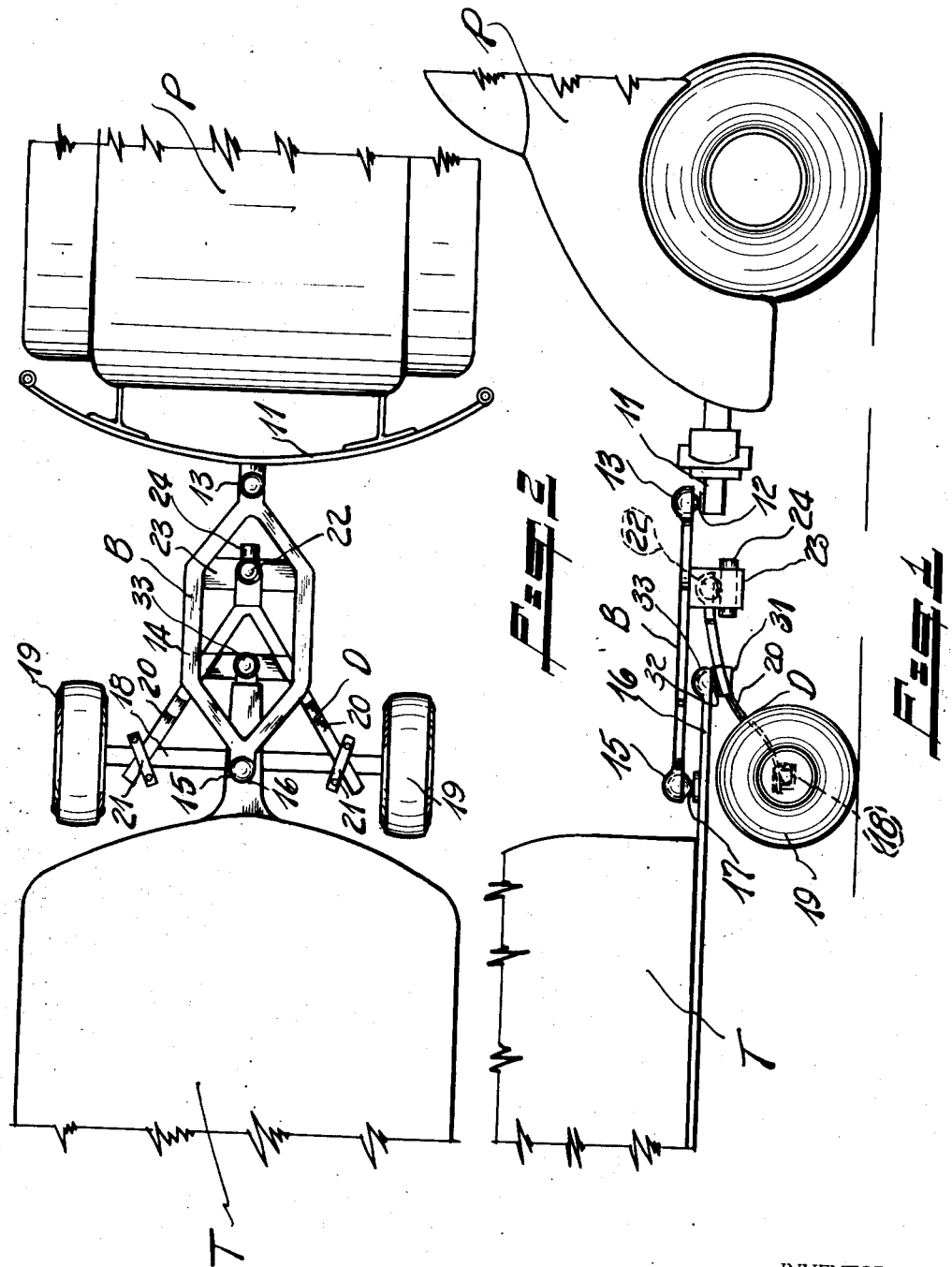

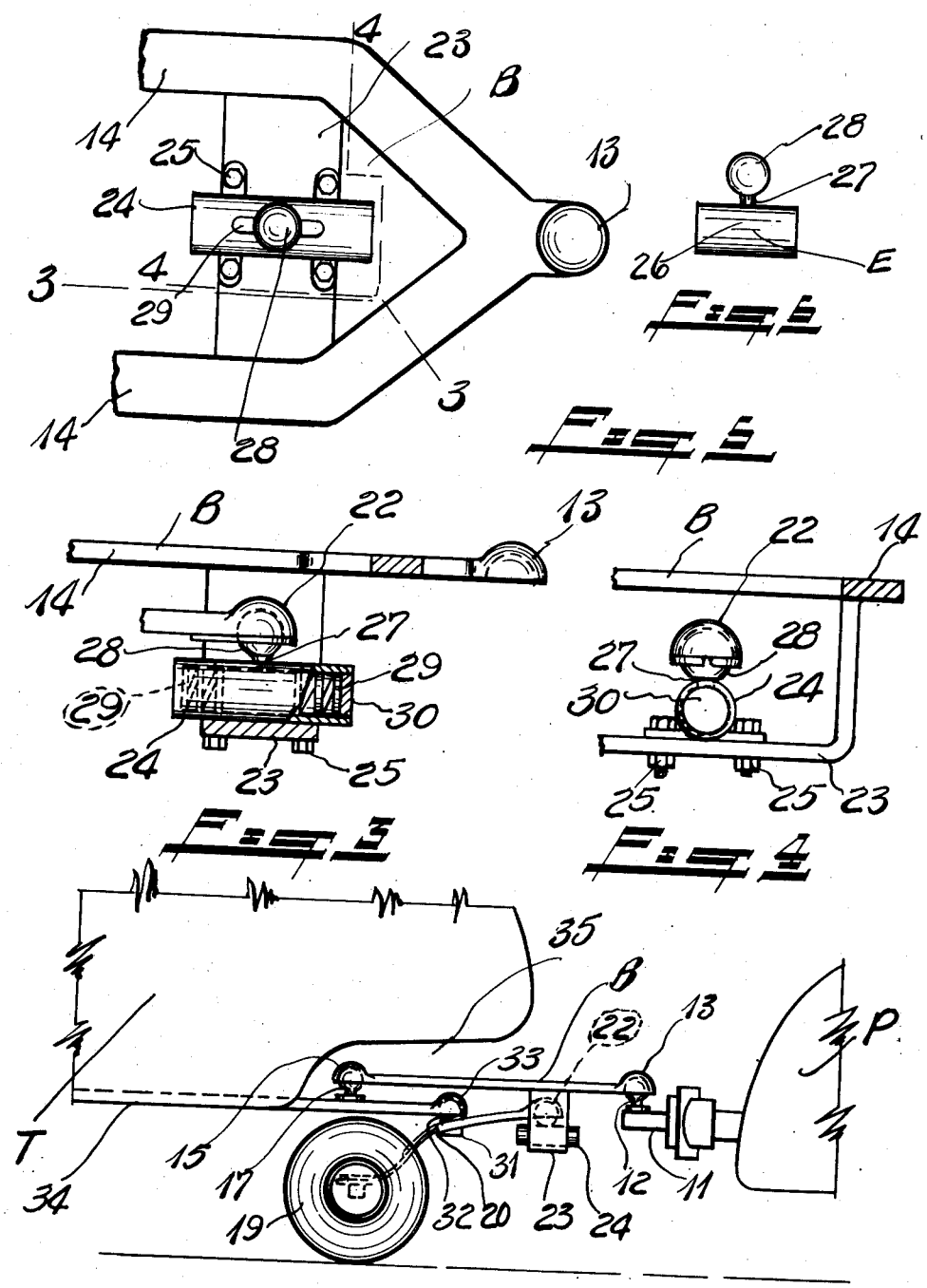

2,309,204

UNITED STATES PATENT OFFICE 2,309,204

TRAILER COUPLING AND STEERING APPARATUS

Arthur R. Nelson, Bay City, Mich.

Application January 23, 1941, Serial No. 375,576

5 Claims. (Cl. 280—33.5)

This invention relates to means for coupling a trailer and bogie to a power vehicle and in such manner that the bogie may be removed when desired and the trailer coupled direct to the power vehicle.

One of the prime objects of the invention is to design a wheeled supporting means for supporting the front end of the trailer, including a draw bar means so organized and connected that the trailer can be accurately backed up when necessary and desired.

Another object is to provide means for coupling the trailer vehicle to the supporting bogie, as well as means for universally connecting the bogie and trailer to the power vehicle.

A further object is to provide a simple, practical, and substantial hook-up by means of which the trailer can be accurately backed up and provide the necessary play in the hook-up between the bogie and the draw bar to compensate for turning movements of the vehicles.

A still further object is to provide a simple, practical, and economical coupling means associated with the supporting bogie and which can be readily manufactured, assembled, and applied.

The instant mechanism includes a bogie of the same general design as described in my co-pending application for Letters Patent on "Trailer dollies," Serial No. 329,644, filed April 15, 1940. This dolly supports the front end of the trailer and is coupled to the towing vehicle; whereas in the present construction, the main draw bar is coupled to the towing and towed vehicle, and the bogie is connected to the tow bar at a point intermediate its length, so that both vehicles may be readily and accurately backed and guided around corners and curves.

In the drawings:

Fig. 1 is a fragmentary, side elevational view, showing the trailer and bogie coupled to a power vehicle;

Fig. 2 is a top plan view thereof;

Fig. 3 is an enlarged, side elevational view taken on the line 3—3 of Fig. 5;

Fig. 4 is a fragmentary, end view taken on the line 4—4 of Fig. 5;

Fig. 5 is a fragmentary, top plan view of the draw bar, etc.; and,

Fig. 6 is an enlarged detail illustrating the slidable ball bolt assembly;

Fig. 7 is a view similar to Fig. 1 and showing the draw bar connected direct to the trailer frame.

In the present application there is shown a power vehicle P and a trailer vehicle T, the front end of which is supported on a bogie D, this bogie being substantially the same as shown and described in the application above referred to.

The power vehicle P is provided with bumpers 11 as usual and one end of a draw bar B is connected thereto, a ball bolt 12 being rigidly mounted on the bumper or the under carriage of the vehicle in any desired manner, and the front end of the draw bar is universally connected thereto, it being provided with a ball coupling or socket 13 as usual.

In the present instance I have shown the draw bar B formed with spaced apart bars 14, the front and rear ends of which converge and terminate in ball sockets 13 and 15, respectively. A trailer tongue 16 is securely attached to and forms a part of the trailer T in the conventional manner, and a ball bolt 17 is provided on said tongue at a point spaced inwardly from the outer end thereof, and the socket member 15 is engageable therewith to provide a universal connection thereat.

The bogie D comprises an axle member 18 carried on ground engaging wheels 19 in the conventional manner, and the bogie tongue is rigidly secured to said axle, said tongue comprising a pair of pre-shaped resilient members 20, the inner ends of which are spaced apart and rigidly secured to the bogie axle 18 by means of clamps 21, the outer ends converging and terminating in a socket 22 and by means of which the bogie is connected to the draw bar B.

A transversely disposed brace 23 spans the draw bar frame B and is cast integral therewith or rigidly secured thereto, and a tubular member 24 is rigidly mounted on this brace by means of bolts 25. This tube member 24 is hollow as shown and a ball bolt assembly E is slidably mounted therein, said assembly including a ball bolt 26, the neck 27 of which is accommodated in an elongated slot 28 provided in the hollow tube 24. Springs 29 are provided in the tube 24 as shown and are transposed between the ends of the tube and the ends of the assembly 26, so that the ball bolt is yieldably mounted to compensate for turning movements when backing around curves and corners, a cap 30 forming a closure for one end of the tube 24 to facilitate assembly of the springs and ball bolt.

The bogie tongue 20 is also provided with a transversely disposed brace 31 intermediate its length and a ball bolt 32 is mounted thereon, a ball socket 33 being provided on the extreme end of the trailer tongue, and engages the ball bolt 32 to form a universal connection at this point.

In this hook-up it will be noted that the draw bar "B" is universally connected to the trailer tongue and to the power vehicle proper so that the pull is direct. The bulk of the weight of the front end of the trailer is carried on the bogie at the coupling point 32.

Due to the point of connection of the draft tongue "B" to the trailer tongue 16 with relation to the point of connection of the trailer tongue to the bogie, it is necessary to provide for certain movement or play between the bogie tongue 20 and the draw bar B to compensate when turning corners, backing around curves, etc.; and this I have provided for by yieldably mounting the ball bolt assembly E in the tube 24.

Heretofore, it has been very difficult, if not impossible, to back trailers using the well-known ball-hitch as a coupling means, either straight or on a curve with any degree of accuracy, because of the tendency to jack-knife; but in my new design this can now be readily accomplished because the point of connection of the trailer tongue to the bogie, the trailer tongue to the draw bar, and the bogie tongue to the draw bar serves to accurately guide the bogie and the trailer, preventing any jack-knifing, and by manipulation of the steering wheel of the power vehicle, the trailer can be backed around curves and corners or handled to make any reasonable degree of turn of the turning vehicle.

In Fig. 7 of the drawings I have shown the draw bar connected direct to the trainer frame 34, so that the bogie wheels are disposed beneath the front end of the trailer T, the trailer body being recessed as at 35 to provide necessary clearance. This hook-up provides for closer coupling and lends itself to a construction which is installed at the factory when the trailer is built whereas the hook-up shown in Figs. 1 and 2 can be applied to trailers and bogies at present in general use.

The hook-up is simple, practical, and substantial. It relieves all stress and strains on the power vehicle, provides that the bulk of the weight of the front end of the trailer be carried on the bogie, the resilient tongue of which insures smooth, easy riding, it travels at high speeds without rocking or shimmy, and can be readily and quickly attached and/or detached.

It will, of course, be obvious that any desired design of coupling can be used, and that the draw bar can be cast or fabricated from structural shapes or bars.

From the foregoing description, it will be obvious that I have perfected a very simple, practical, economical, and substantial hook-up for connecting trailer and supporting bogies to the power vehicle so that they can be accurately backed around corners or curves as desired.

What I claim is:

1. A coupling apparatus for securing a trailer to a lead vehicle and comprising a draw bar having a universal connection at each end thereof, one end being connected to the lead vehicle, with the opposite end connected to the trailer tongue at a point spaced rearwardly from the outer end thereof, a ball bolt yieldably mounted on said draw bar, a bogie provided with a resilient tongue universally connected to the said ball bolt, and means for universally connecting the end of the trailer tongue to the bogie tongue at a point intermediate the draw bar connection to the trailer tongue and the bogie tongue connection to the draw bar.

2. A coupling and back up apparatus for securing a trailer to a power vehicle and comprising a draw bar having a universal connection at the opposite ends thereof, one end being universally connected to the power vehicle, the opposite end being universally connected to the trailer tongue at a point spaced rearwardly from the outer end thereof, an individual mobile bogie structure provided with a tongue universally and yieldingly connected to said draw bar at a point intermediate its length, and means for universally connecting the end of the trailer tongue to said bogie tongue at a point spaced between the bogie axle and the point of connection to the draw bar.

3. A coupling and steering apparatus for connecting a trailer to a power vehicle and comprising a draw bar including spaced apart side bars terminating in ball couples at the ends thereof, one end being universally connected to the power vehicle with the opposite end connected to the trailer tongue at a point spaced rearwardly from the outer end thereof, a brace spanning the side bars, a ball bolt yieldably mounted thereon, a bogie provided with a tongue with its outer end universally connected to said ball bolt, and means for universally connecting the end of the trailer tongue to said bogie tongue at a point spaced rearwardly from the point of connection of the bogie tongue to the draw bar.

4. A coupling apparatus for securing a trailer to a power vehicle, comprising a draw bar universally connected to the trailer tongue and to the power vehicle respectively, a bogie provided with a resilient tongue universally connected to the draw bar at a point intermediate its length, and means for universally connecting the trailer tongue to the bogie tongue at a point intermediate the bar connection to the trailer tongue and the bogie tongue connection to the draw bar.

5. A coupling and steering apparatus for connecting a trailer to a power vehicle and comprising a draw bar terminating in ball couplings at the opposite ends thereof, one end being universally connected to the power vehicle with the opposite end connected to the trailer tongue at a point spaced rearwardly from the outer end thereof, a ball bolt yieldably mounted on the draw bar at a point intermediate the ends thereof, a bogie provided with a tongue having its outer end universally connected to the ball bolt, and means for universally connecting the end of the trailer tongue to said bogie tongue at a point spaced rearwardly from the point of connection of the bogie tongue to the draw bar.

ARTHUR R. NELSON.